United States Patent [19]

Holze, Jr.

[11] Patent Number: 4,711,693

[45] Date of Patent: Dec. 8, 1987

[54] ANVIL FOR ULTRASONIC SLITTING APPARATUS

[75] Inventor: Ernest P. Holze, Jr., Brewster, N.Y.

[73] Assignee: Branson Ultrasonics Corp., Danbury, Conn.

[21] Appl. No.: 882,464

[22] Filed: Jul. 7, 1986

[51] Int. Cl.[4] ............................................. B29C 65/08
[52] U.S. Cl. ................................. 156/580.1; 156/73.3; 156/88; 156/515; 156/580.2
[58] Field of Search .................... 156/73.1, 73.2, 73.3, 156/580.1, 580.2, 88, 515; 228/1.1; 264/23; 425/174.2

[56] References Cited

U.S. PATENT DOCUMENTS

| | | | |
|---|---|---|---|
| 3,405,024 | 10/1968 | Attwood | 228/1.1 |
| 3,765,589 | 10/1973 | Walraven et al. | 156/73.1 |
| 4,040,886 | 8/1977 | Yen et al. | 228/1.1 |
| 4,534,819 | 8/1985 | Payet et al. | 156/580.2 |
| 4,623,420 | 11/1986 | Hinkley | 156/580.2 |

*Primary Examiner*—Michael Wityshyn
*Attorney, Agent, or Firm*—Ervin B. Steinberg

[57] ABSTRACT

An anvil for an ultrasonic textile slitting apparatus comprises an elongated, flat, substantially rectangular, housing in which a piston is disposed for motion relative to the housing. A mass dimensioned to act as a half wavelength resonator is coupled to the piston and is provided with a slitting implement for establishing responsive to fluid pressure acting upon the piston contact with an ultrasonic horn. The mass is dimensioned to be resonant at a frequency not lower than the resonant frequency of the ultrasonic horn and preferably is dimensioned to be resonant at a frequency somewhat higher than that of the horn. In a typical example, the horn has a resonant frequency of 20 kHz while the mass has a resonant frequency of 25 kHz.

5 Claims, 2 Drawing Figures

ANVIL FOR ULTRASONIC SLITTING APPARATUS

BRIEF SUMMARY OF THE INVENTION

This invention relates to textile slitting apparatus and, more specifically, refers to an anvil construction for an ultrasonic slitting apparatus. Quite specifically, this invention concerns an anvil construction for an ultrasonic slitting apparatus wherein a plurality of anvils are in contact with an ultrasonic horn for slitting thermoplastic textile material, or material having a thermoplastic fiber content, into a plurality of narrow strips. Moreover, this application relates to improvements of an anvil construction shown in copending application for U.S. Letters Patent Ser. No. 06/742,048 filed June 6, 1985 in the name of Charles H. Hinkley and assigned to the same assignee, now U.S. Pat. No. 4,623,420 dated Nov. 18, 1986.

The use of ultrasonic energy for slitting textile material is well known in the art and has been described, for instance, in the U.S. Pat. No. 3,378,429 dated Apr. 16, 1968 issued to E. Obeda; U.S. Pat. No. 3,737,361 dated June 5, 1973 issued to E. Obeda; U.S. Pat. No. 3,852,144 dated Dec. 3, 1974 issued to F. Parry; and U.S. Pat. No. 4,097,327 dated June 27, 1978 issued to P. Calemard.

The advantage of ultrasonic slitting over the conventional textile slitting process resides in the fact that simultaneously with the cut, a sealed edge is obtained on the textile material, thereby preventing the unraveling of threads or the appearance of a frayed edge. When slitting textile material into narrow strips, the anvil must be of substantially flat or narrow construction in order to permit a plurality of anvils to be positioned in close proximity to one another. Generally, a plurality of anvils operate in conjunction with a single ultrasonic horn, usually of blade type configuration. Textile material to be slit is fed through the nip between the anvils and the frontal or output surface of the horn.

When using ultrasonic energy for slitting, several unusual conditions not present in conventional slitting machines exist.

The anvil includes a slitting means which is urged against the output surface of the ultrasonic horn which is undergoing vibratory motion. The horn, when resonant at a typical operating frequency of 20 kHz, undergoes at its output surface a peak-to-peak amplitude excursion of 0.001 to 0.003 inch (0.025 to 0.076 mm). This motion at the stated ultrasonic frequency causes the presence of very high acceleration forces, in the order of several thousand g. Such forces cause the slitting means, which is urged against the output surface of the horn, to be repetitively impacted and driven away from the horn. However, in order to assure a continuous slitting operation without skipping any length of the material, it is essential that the slitting implement remain continuously in intimate contact with the output surface of the horn and follow the horn excursion despite the presence of the unique acceleration forces. Furthermore, the anvil is subject to severe vibratory forces which must be dealt with in a manner to provide the necessary vibratory isolation between the slitting implement and the remaining anvil structure. Last but not least, the anvil structure must be characterized by simplicity and highest reliability under these severe operating conditions.

The anvil described hereafter reveals a construction which has successfully been developed for ultrasonic slitting applications and which includes the unique dynamic features required to cause the slitting implement to be maintained in steady contact with the ultrasonic horn. In addition, the construction disclosed is of a flat configuration to permit anvils to be mounted in close proximity to one another.

One of the principal objects of this invention, therefore, is the provision of a new and improved anvil construction.

A further important object of this invention is the provision of a new and improved anvil construction including slitting means for use in ultrasonic textile slitting equipment.

A further important object of this invention is the provision of an anvil construction for ultrasonic textile slitting suited for the unique dynamic forces manifest in ultrasonic slitting.

Another important object of this invention is the provision of an anvil for an ultrasonic slitting apparatus, the anvil being of rectangular and relatively thin construction, thus permitting anvils to be mounted in close proximity to one another.

A still further and other important object of this invention is the provision of an anvil for an ultrasonic slitting apparatus, the anvil being characterized by simplicity and high reliability, and including means for causing a slitting implement, forming a part of the anvil, to be in continuous contact with the output surface of an ultrasonic horn.

Further and still other objects of this invention will be more clearly apparent by reference to the following description when taken in conjunction with the accompanying drawings.

DETAILED DESCRIPTION OF THE INVENTION

Figure 1:
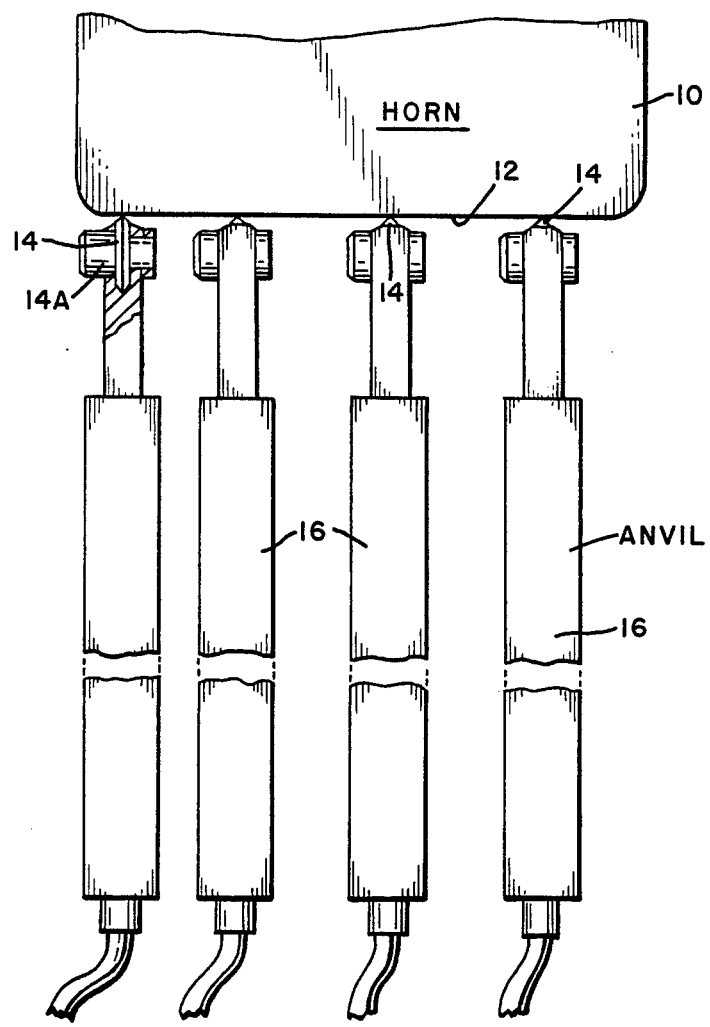
FIG. 1 is a partial elevational view of an ultrasonic slitting apparatus showing an ultrasonic horn and a plurality of anvils mounted in close proximity to one another and in contact with the ultrasonic horn.

Referring now to the figures, and FIG. 1 in particular, there is shown a portion of an ultrasonic horn, numeral 10, the frontal or output surface 12 of which is contacted by a plurality of slitting implements 14, each such slitting implement being a part of a respective anvil 16. The anvils 16 are elongated and of narrow rectangular shape so that a plurality of anvils, as shown, can be mounted in cooperative relationship with a single horn 10. Each slitting implement 14 is adapted to slit textile material fed through the nip between the slitting implement and the frontal surface 12 of the horn 10 so that the width of the resulting textile strips is determined by the spacing of the anvils and associated slitting implements.

The construction and operation of ultrasonic horns is well known in the art and can be found, for instance, in the book "Ultrasonic Engineering" by Julian R. Frederick, John Wiley & Sons, Inc., New York (1965), pages 87 through 103. In a preferred embodiment, the horn 10 is of blade-like construction as seen, for instance, in U.S. Pat. No. 3,113,225 issued on Dec. 3, 1963 in the name of C. Kleesattel.

In a typical example, the horn 10 is dimensioned to be resonant at a predetermined frequency of 20 kHz, causing the frontal surface 12 to undergo a motional excursion in the order of 0.001 to 0.003 inch (0.025 to 0.076 mm) at this predetermined frequency. It should be apparent that any other frequency in the range between 10 kHz and 60 kHz may be selected for slitting, provided that the material and other operating conditions are suitable.

Figure 2:
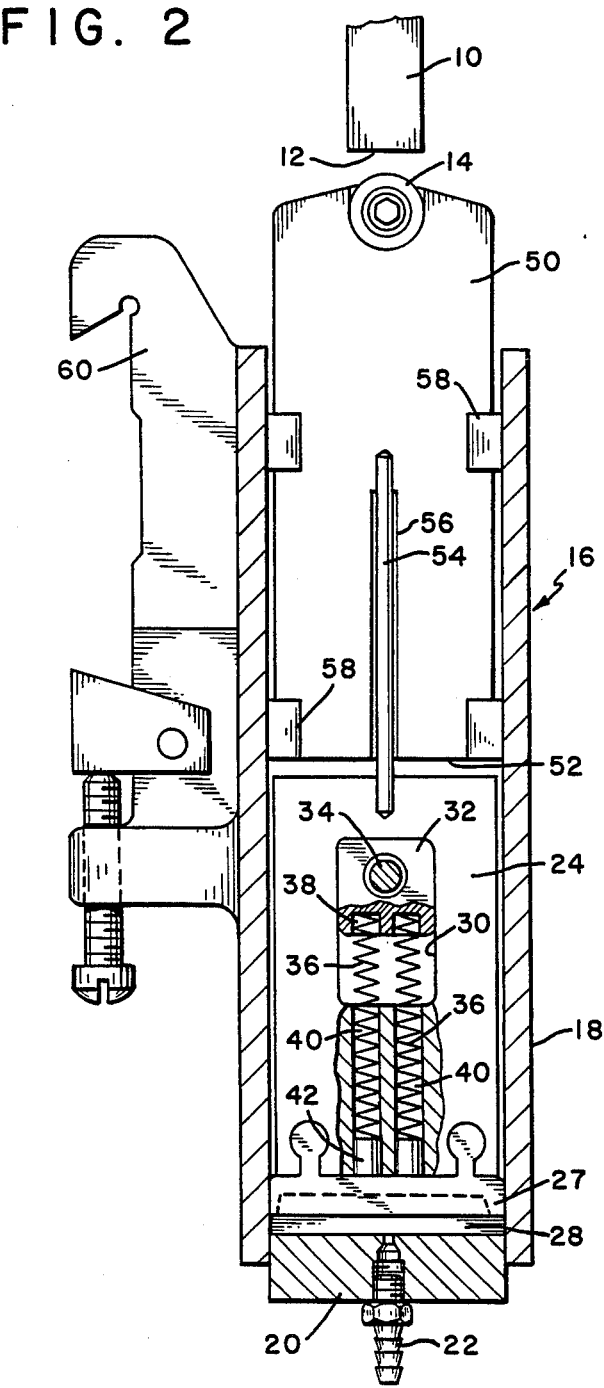
FIG. 2 is a sectional view of a preferred embodiment of the anvil construction, the anvil being in the retracted position.

Referring now to FIG. 2, there is shown the anvil assembly 16. The anvil assembly comprises a housing 18 which is made, for instance, from one-half inch thick brass plate stock and includes a flat cover, or, alternatively, the plate stock is hobbed out to provide an internal cavity for receiving the various parts. The lower end of the housing 18 is sealed by a plug 20 which is brazed to the housing. A fluid connecting coupling 22 is threaded to the plug 20 to be connected to a fluid source for providing fluid pressure to the inside of the housing 18. Within the housing there is disposed a piston 24 of rectangular cross-section. The lower end of the piston 24 is provided with a cup shaped fluid seal 27 to provide with the housing a chamber 28 adapted to be pressurized with a fluid supplied through the coupling 22. In addition, the piston 24 is provided with an internal rectangularly shaped aperture 30 within which there is disposed a guide 32 fixedly secured to the housing 18 by means of a pin 34. The guide 32, in conjunction with the aperture 30, limits the longitudinal motion of the piston 24. The piston 24 is urged toward the lower end of the housing 18 by a set of helical compression springs 36 which, at one end thereof, are confined in respective bores 38 of the guide 32 and which, at the other end, are confined in respective bores 40 of the piston 24. Each bore 40 is sealed off by a plug 42 which acts as a seat for the associated spring 36.

The piston 24 is coupled to a metal mass 50, for instance steel, which is dimensioned to act as a half wavelength resonator for ultrasonic energy traveling longitudinally therethrough from the upper end, at which the slitting implement 14 is disposed, to the lower end defined by surface 52. The mass 50 is dimensioned to be resonant at a frequency not lower than the predetermined frequency at which the horn 10 is resonant. In the preferred embodiment, the mass 50 is dimensioned to be resonant at a frequency somewhat higher than that of the horn 10. Thus, in an actual embodiment, the horn is dimensioned to be resonant at a frequency of 20 kHz whereas the mass 50 is dimensioned to be resonant as a half wavelength resonator at a frequency of 25 kHz.

Mechanical coupling between the piston 24 and mass 50 is achieved by a centrally disposed rod 54, one end of which is attached by a press fit to the upper end of the piston 24, and the other end is fastened by a press fit to the mass 50 substantially at the nodal region of the longitudinal vibrations of the mass. A central bore 56 in the mass 50 provides clearance for the rod 54.

Low friction material, such as Teflon tape 58, provides bearing surfaces between the mass 50 and the housing 18 inside.

The slitting implement 14, in the preferred embodiment, is a wheel having a centrally disposed peripheral cutting surface and adjoining inclined sealing surface as known in the art, see for instance U.S. Pat. No. 4,560,427 dated Dec. 24, 1985 issued to G. N. Flood. Screw means 14A fastens the wheel to the mass 50.

The wheel is normally non-rotating and as a portion of the cutting surface which is in contact with the frontal surface 12 of the horn 10 becomes worn, the wheel is slightly rotated to expose another portion of the cutting surface to the horn.

The anvil housing 18 is provided, moreover, with a dovetail mount 60 and associated hardware to clamp the anvil mechanism 16 upon a rail of a conventional textile slitting machine. The dovetail mount 60 is well understood in the art and need not be described in detail and does not form a part of this invention.

Operation of the mechanism described hereinabove can be visualized as follows:

Responsive to fluid pressure applied through the coupling 22, the chamber 28 is pressurized with fluid, causing the piston 24 to be driven upward and causing the slitting implement to be driven into resilient contact with the output surface 12 of the horn. The combination of fluid pressure in chamber 28 and the force provided by springs 36 together with the resonant mass causes the slitting implement 14 to be retained in continuous contact with the output surface of the horn 10 despite the high acceleration forces manifest at the output surface of the horn, which forces tend to cause the slitting implement 14 to be urged away from such contact. The continuous contact of the slitting implement against the output surface 12 of the horn is essential in order to prevent any portion of the material passing through the nip from not being slit. Any lack of contact which may exist, at least theoretically, is of such short duration as not to affect the slitting process.

While there has been described and illustrated a preferred embodiment of the anvil construction for use in an ultrasonic slitting apparatus, it will be apparent to those skilled in the art that various changes and modifications can be made therein without deviating from the principle of the invention which shall be limited only by the scope of the appended claims.

What is claimed is:

1. An anvil for an ultrasonic slitting device operative in conjunction with a horn dimensioned to be resonant at a predetermined ultrasonic frequency comprising:
   a housing;
   a piston slidably mounted in said housing for limited motion in said housing;
   a mass, dimensioned to be resonant as a half wavelength resonator for ultrasonic energy traveling longitudinally therethrough at a frequency not lower than the resonant frequency of said horn, coupled to said piston for motion therewith;
   a slitting implement fastened to one end of said mass in position for being urged into contact with said horn;
   means coupled to said housing for causing responsive to fluid pressure said piston to be driven toward contact between said slitting implement and said horn, and
   said mass coupled to said piston by a centrally disposed rod secured with one end to said piston and with the other end to said mass substantially at a nodal region of said mass.

2. An anvil for an ultrasonic slitting device as set forth in claim 1, said mass being dimensioned for being resonant at a frequency higher than the resonant frequency of said horn.

3. An anvil for an ultrasonic slitting device as set forth in claim 1, said mass being dimensioned for being resonant at a frequency above 20 kHz when the horn is dimensioned to be resonant substantially at a frequency of 20 kHz.

4. An anvil for an ultrasonic slitting device as set forth in claim 1, and including spring means operative between said piston and said housing for exerting a force which is opposite to that provided by the fluid pressure.

5. An anvil for an ultrasonic slitting device as set forth in claim 1, and mounting means extending from said housing for mounting said housing in stationary position.

* * * * *